United States Patent
Heo

(10) Patent No.: US 7,009,355 B2
(45) Date of Patent: Mar. 7, 2006

(54) WIPER CONTROL SYSTEM FOR A VEHICLE AND A METHOD THEREOF

(75) Inventor: Jea Sung Heo, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/747,889

(22) Filed: Dec. 29, 2003

(65) Prior Publication Data
US 2005/0046372 A1    Mar. 3, 2005

(30) Foreign Application Priority Data
Sep. 3, 2003    (KR) .................... 10-2003-0061535

(51) Int. Cl.
*H02P 1/00*    (2006.01)
(52) U.S. Cl. ............... 318/483; 318/DIG. 2; 318/461; 318/456; 318/445
(58) Field of Classification Search ............ 318/456, 318/461, 483, DIG. 2, 443, 445; 15/250.001, 15/250.12
See application file for complete search history.

(56) References Cited

U.S. PATENT DOCUMENTS

| | | | |
|---|---|---|---|
| 4,585,980 A * | 4/1986 | Gille et al. ................ | 318/444 |
| 4,705,998 A * | 11/1987 | Millerd et al. ............. | 318/444 |
| 4,987,354 A * | 1/1991 | Steinmann ................. | 318/444 |
| 5,057,754 A * | 10/1991 | Bell ........................... | 318/483 |
| 5,059,877 A * | 10/1991 | Teder ......................... | 318/444 |
| 5,140,234 A * | 8/1992 | Wallrafen .................. | 318/264 |
| 5,166,587 A * | 11/1992 | Smart ......................... | 318/444 |
| 5,200,676 A * | 4/1993 | Mueller et al. ............ | 318/444 |
| 5,216,341 A * | 6/1993 | Nomura et al. ............ | 318/444 |
| 5,239,244 A * | 8/1993 | Teder ......................... | 318/444 |
| 5,276,389 A * | 1/1994 | Levers ........................ | 318/444 |
| 5,304,936 A * | 4/1994 | Buschur .................... | 324/689 |
| 5,306,992 A * | 4/1994 | Droge ........................ | 318/483 |
| 5,323,637 A * | 6/1994 | Bendicks et al. .......... | 73/29.01 |
| 5,508,595 A * | 4/1996 | Schaefer .................... | 318/444 |
| 5,598,146 A * | 1/1997 | Schroder ................... | 340/602 |

(Continued)

FOREIGN PATENT DOCUMENTS

JP    05-129030    5/1993

OTHER PUBLICATIONS

Ka C. Cheok; Kobayashi, K; Scaccia, S; Scaccia, G; A Fuzzy logic-based smart automatic windshield wiper; Dec., 1996; Control Systems Magazine, IEEE, vol.: 16, Issue: 6. p. 28-34.*

*Primary Examiner*—David Martin
*Assistant Examiner*—Elias Hiruy
(74) *Attorney, Agent, or Firm*—Morgan Lewis & Bockius LLP

(57) ABSTRACT

A wiper control system is provided which comprises a rain droplet detector, a multiplexer, a count register, and a wiper control unit. The rain droplet detector has a plurality of switches that are configured to be electrically connected by rain droplets, and each switch outputs one of two different signals according to an electrical connection thereof. The multiplexer receives signals from each of the plurality of the switches, and it is configured to repeatedly perform a process of selecting one of the received signals and outputting the selected signal. The count register is connected to the multiplexer to receive the signal output from the multiplexer, and it counts a number of the signals corresponding to the electrical connection of the switches of the rain droplet detector and outputs a counted value. The wiper control unit controls a speed of a wiper based on the counted value.

14 Claims, 3 Drawing Sheets

U.S. PATENT DOCUMENTS

| | | | | |
|---|---|---|---|---|
| 5,663,542 A | * | 9/1997 | Kohr et al. | 200/61.05 |
| 5,780,719 A | * | 7/1998 | VanDam | 73/29.01 |
| 5,801,539 A | * | 9/1998 | Schroder | 324/694 |
| 5,836,339 A | * | 11/1998 | Klever et al. | 137/78.2 |
| 5,861,758 A | * | 1/1999 | Berberich | 324/694 |
| 5,900,821 A | * | 5/1999 | Petzold | 340/604 |
| 5,959,457 A | * | 9/1999 | Berberich | 324/710 |
| 6,057,660 A | * | 5/2000 | Meier et al. | 318/483 |
| 6,084,417 A | * | 7/2000 | Berberich | 324/711 |
| 6,121,741 A | * | 9/2000 | Berger et al. | 318/483 |
| 6,144,906 A | * | 11/2000 | Buchanan et al. | 701/36 |
| 6,147,466 A | * | 11/2000 | Stronczek | 318/443 |
| 6,175,205 B1 | * | 1/2001 | Michenfelder et al. | 318/444 |
| 6,218,741 B1 | * | 4/2001 | Braun et al. | 307/10.1 |
| 6,359,407 B1 | * | 3/2002 | Michenfelder et al. | 318/443 |
| 6,388,411 B1 | * | 5/2002 | Ostrowski | 318/461 |
| 6,617,564 B1 | * | 9/2003 | Ockerse et al. | 250/208.1 |
| 6,690,130 B1 | * | 2/2004 | Klug et al. | 318/444 |
| 6,696,808 B1 | * | 2/2004 | Schmid et al. | 318/445 |
| 6,703,804 B1 | * | 3/2004 | Courdier et al. | 318/445 |
| 6,734,644 B1 | * | 5/2004 | Kaneko et al. | 318/85 |
| 6,802,205 B1 | * | 10/2004 | Barguirdjian et al. | 73/73 |
| 6,825,629 B1 | * | 11/2004 | Herrmann | 318/483 |
| 2001/0043047 A1 | * | 11/2001 | Klug et al. | 318/444 |
| 2002/0003410 A1 | * | 1/2002 | Lassle | 318/445 |
| 2003/0020422 A1 | * | 1/2003 | Schmid et al. | 318/445 |
| 2003/0101529 A1 | * | 6/2003 | Metz | 15/250.001 |
| 2003/0169008 A1 | * | 9/2003 | Hermann | 218/483 |
| 2004/0183492 A1 | * | 9/2004 | Mitsumoto | 318/443 |
| 2005/0080528 A1 | * | 4/2005 | Obradovich | 701/36 |

* cited by examiner

WIPER CONTROL SYSTEM FOR A VEHICLE AND A METHOD THEREOF

CROSS-REFERENCE TO RELATED APPLICATIONS

This application claims the benefit of priority of Korean Application No. 10-2003-0061535, filed on Sep. 3, 2003, the disclosure of which is incorporated herein by reference in its entirety.

FIELD OF THE INVENTION

The present invention relates to a windshield wiper control system for a vehicle and a control method thereof. In particular the present invention relates to a windshield wiper control system that assigns a wiper speed to one of a number of levels, based on a count of a number of water droplets.

BACKGROUND OF THE INVENTION

A conventional automatic wiper control system uses a rain sensor that is attached to a windshield, which detects rain using a refractive index of light. A wiper controller controls a wiper speed according to an amount of rain using signals of the rain sensor.

Such conventional wiper control system cannot optimally operate the wiper according to the amount of rain. In particular, a wiper speed may become too high so that it hinders a driver's vision.

The information disclosed in this Background of the Invention section is only for enhancement of understanding of the background of the invention, and should not be taken as an acknowledgement or any form of suggestion that this information forms the prior art that is already known to a person skilled in the art.

SUMMARY OF THE INVENTION

Embodiments of the present invention provide a wiper control system and a wiper control method for a vehicle, capable of optimally controlling a wiper speed according to an amount of rain.

In a preferred embodiment of the present invention, the wiper control system comprises a rain droplet detector, a multiplexer, a count register, and a wiper control unit. The rain droplet detector has a plurality of switches that are configured to be electrically connected by rain droplets, and each switch outputs one of two different signals according to an electrical connection thereof. The multiplexer receives signals from each of the plurality of the switches, and it is configured to repeatedly perform a process of selecting one of the received signals and outputting the selected signal. The count register is connected to the multiplexer to receive the signal output from the multiplexer, and it counts a number of the signals corresponding to the electrical connection of the switches of the rain droplet detector and outputs a counted value. The wiper control unit is connected to the count register to receive the counted value, and it controls a speed of a wiper based on the counted value.

Preferably, the wiper control system further comprises a clock signal provider providing a clock signal to the multiplexer, and the multiplexer selects one of the signals input from the rain droplet detector based on the received clock signal.

It is preferable that the multiplexer is configured to sequentially output the signals input from the plurality of the switches responding to the received clock signal.

Preferably, the wiper control system further comprises a wiper position sensor detecting a position of the wiper and outputting a corresponding wiper position signal, and the clock signal provider receives the wiper position signal and is configured to output the clock signal when the wiper rotates by a predetermined angle. Furthermore, preferably, the predetermined angle is 45 degrees.

It is preferable that the wiper control unit determines a rain droplet amount level based on the received counted value, determines a wiper speed level based on the determined rain droplet amount level, and controls the wiper to operate at the determined speed level.

It is further preferable that the wiper control unit determines the rain droplet amount level using the counted values that are acquired during 3 strokes of the wiper.

Preferably, the wiper control system further comprises a vehicle speed sensor detecting a vehicle speed and outputting a corresponding vehicle speed signal, and the wiper control unit receives the vehicle speed signal and controls the speed of the wiper based on the vehicle speed signal.

It is preferable that the wiper control unit stops a control of the speed of the wiper when the vehicle speed is higher than a predetermined speed.

It is also preferable that the wiper control unit is programmed to perform a control logic comprising: determining an initial wiper speed level among a plurality of wiper speed levels corresponding to different wiper speeds; determining a current rain droplet amount level among a plurality of rain droplet amount levels based on the received counted value; and controlling the speed of the wiper based on the initial wiper speed level and the determined rain droplet amount level.

In an embodiment of the present invention, the wiper control method comprises: determining an initial wiper speed level among nine predetermined wiper speed levels that include nine sequential levels from a wiper speed level 1 to a wiper speed level 9, each of the predetermined wiper speed levels corresponding to a different wiper speed; detecting an amount of rain droplets and determining a corresponding rain droplet amount level among seventeen predetermined rain droplet amount levels that include seventeen sequential levels from a rain droplet amount level 0 to a rain droplet amount level 16, each of the predetermined rain droplet amount levels corresponding to a different rain droplet amount; and controlling a wiper speed based on the rain droplet amount level and the initial wiper speed level.

It is preferable that in a method of controlling a wiper according to the present invention, the wiper speed level is regulated based on the rain droplet amount level and the initial wiper speed level, and the wiper is controlled to operate for a predetermined number of times in response to the regulated wiper speed level.

Preferably, in a method of controlling a wiper according to the present invention, the wiper is controlled to not operate if it is determined that the amount of the rain droplets corresponds to the rain droplet amount level 0, which is indicative of no rain droplets.

Preferably, in a method of controlling a wiper according to the present invention, in the case that the amount of the rain droplets corresponds to a rain droplet amount level 1, the wiper speed level is maintained if the initial wiper speed level is the wiper speed level 1, the wiper speed level is lowered by one level if the initial wiper speed level is the wiper speed level 2, and the wiper speed level is lowered by two levels if the initial wiper speed level is between a wiper speed level 3 and a wiper speed level 9.

It is preferable that in a method of controlling a wiper according to the present invention, in the case that the amount of the rain droplets corresponds to between a rain droplet amount level 2 and a rain droplet amount level 4, the wiper speed level is maintained if the initial wiper speed level is the wiper speed level 1, and the wiper speed level is lowered by one level if the initial wiper speed level is between a wiper speed level 3 and a wiper speed level 9.

Preferably, in a method of controlling a wiper according to the present invention, in the case that the amount of the rain droplets corresponds to between a rain droplet amount level 5 and a rain droplet amount level 12, the wiper speed is maintained at the initial wiper speed level.

Preferably, in a method of controlling a wiper according to the present invention, in the case that the amount of the rain droplets corresponds to between a rain droplet amount level 13 and a rain droplet amount level 15, the wiper speed level is increased by one level if the initial wiper speed level is between a wiper speed level 1 and a wiper speed level 8, and the wiper speed level is maintained at the initial wiper speed level if the initial wiper speed level is a wiper speed level 9.

Preferably, in a method of controlling a wiper according to the present invention, in the case that the amount of the rain droplets corresponds to a rain droplet amount level 16, the wiper speed is increased by two levels if the initial wiper speed level is between a wiper speed level 1 and a wiper speed level 7, the wiper speed is increased by one level if the initial wiper speed level is a wiper speed level 8, and the wiper speed is maintained at the initial wiper speed level if the initial wiper speed level is a wiper speed level 9.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
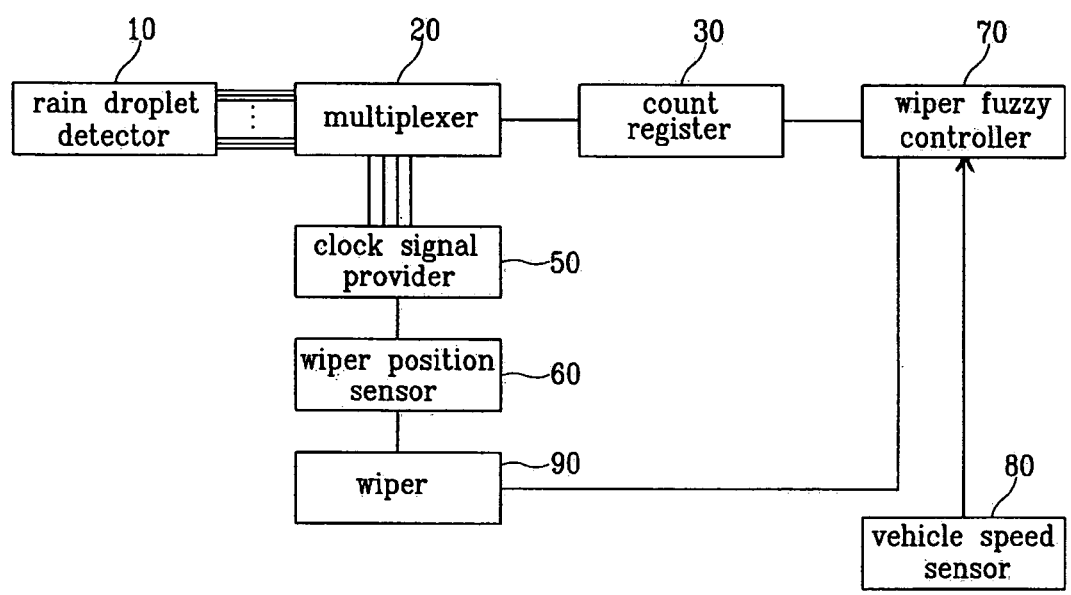
FIG. 1 is a block diagram of a wiper control system according to an embodiment of the present invention.

As shown in FIG. 1, a wiper control system according to a preferred embodiment of the present invention includes a rain droplet detector 10 that detects an amount of rain droplets and outputs a corresponding signal.

In the embodiment of FIG. 1, the rain droplet detector 10 includes a plurality of switches that are mounted on a wiper 90. Each switch includes an input pin and an output pin. In a preferred embodiment, the number of switches is 16, but the number of the switches is not restricted to this.

The input pin and the output pin are configured to be electrically connected to each other when a rain droplet exists therebetween. If the input and output pins are electrically connected, the corresponding switch outputs a high signal, but otherwise the corresponding switch outputs a low signal. Accordingly, a number of the high signals output from the rain droplet detector 10 varies according to an amount of rain droplets that connect input and output pins.

A multiplexer 20 is connected to the rain droplet detector 10. The multiplexer 20 can be a normal multiplexer. That is, the multiplexer 20 routes one of the input values input from input terminals to an output terminal.

Preferably, the multiplexer 20 has a plurality of input terminals whose number is equal to the number of switches of the rain droplet detector 10, and one output terminal. In a preferred embodiment, the multiplexer 20 has sixteen input terminals, and each of the input terminals is respectively connected to each switch of the rain droplet detector 10.

Therefore, in a preferred embodiment, the multiplexer 20 selects one signal of sixteen signals input from the rain droplet detector 10, and outputs the selected signal through the output terminal. Thus, in this embodiment of the present invention, the multiplexer 20 is a 16:1 multiplexer.

In a preferred embodiment, the selection of the input signal in the multiplexer 20 is performed based on a clock signal input from a clock signal provider 50, which is preferably connected to the multiplexer 20 through four terminals. In this embodiment, the clock signal provider 50 provides the multiplexer 20 with a 4-bit clock signal. As an example, the clock signal provider 50 can produce the clock signal using four lower-level bits of an electronic control unit (ECU) of a vehicle. That is, the multiplexer 20 selects one signal from the sixteen input signals based on the 4-bit clock signal.

Subsequently, the multiplexer 20 sequentially outputs the input signals according to the clock signal input from the clock signal provider 50.

The clock signal provider 50 receives a synchronization signal from a wiper position sensor 60 that detects a position of a wiper 90, and outputs the clock signal to the multiplexer 20 in response to receiving the synchronization signal. That is, the timing of outputting of the clock signal is determined based on the synchronization signal input from the wiper position sensor 60.

In a preferred embodiment, the wiper position sensor 60 outputs the synchronization signal to the clock signal provider 50 when the wiper 90 rotates by a predetermined angle (e.g., 45 degrees).

When the wiper 90 is in a vertical state or in a horizontal (initial) state, many rain droplets that had previously been wiped by the wiper 90 may exist around the rain droplet detector 10. In such positions, the rain droplet detector 10 may inaccurately detect an amount of rain droplets. Therefore, it is preferable that an amount of rain droplets is detected when the wiper 90 rotates by 45 degrees.

A count register 30 is connected to the multiplexer 20 to receive the signal output from the multiplexer 20. The counter register 30 sequentially receives the signal from the multiplexer 20, and counts a number of the high signals. An amount of rain droplets is proportional to the number of the high signals.

Eventually, the count register 30 counts a number of the switches of the rain droplet detector 10 that are electrically connected (i.e., turned on). Then, the count register 30 outputs the counted number to a wiper control unit. In a preferred embodiment, the wiper control unit is wiper fuzzy controller 70.

The wiper fuzzy controller 70 controls a speed of the wiper 90 based on the counted number input from the count register 30. In a preferred embodiment, the wiper fuzzy controller 70 determines a rain droplet amount level based on a mean value of count values calculated while the wiper 90 undergoes three strokes, and controls the wiper speed based on the determined rain droplet amount level.

The wiper fuzzy controller 70 preferably includes a processor, a memory, and other necessary hardware and software components, as would be understood by persons of ordinary skill in the art, to permit the control unit to communicate with sensors and to execute the control function as described herein.

Furthermore, the wiper fuzzy controller 70 also receives a vehicle speed signal indicative of a speed of the vehicle, and controls the speed of the wiper 90 based on the received vehicle speed signal. If the vehicle speed is higher than a predetermined speed (e.g., 100 km/h), the wiper fuzzy controller 70 stops a control of the wiper speed, because a change of the wiper speed while the vehicle runs at a high speed may hinder a driver's vision.

The wiper fuzzy controller 70 determines a rain droplet amount level I based on the count value input from the count register 30, and determines a wiper speed level C based on the determined rain droplet amount level.

Because, in a preferred embodiment, the count value input from the count register 30 may be one of seventeen values from 0 to 16, the rain droplet amount level I is set to vary from a level 0 to a level 16 (seventeen levels). If I is 0, there is no rain, and if I is 16, it indicates a maximum amount of rain droplets on the seventeen value scale.

For example, in another preferred embodiment, the wiper speed level C can be set to vary from a level 1 to a level 9.

If the wiper speed is determined, the wiper fuzzy controller 70 controls the wiper 90 to operate a predetermined number of times at the determined speed level. The predetermined number of times can preferably be determined to be proportional to the speed level. For example, the predetermined number of times can be set according to the following table.

| wiper speed level | slower ← → faster | | | | | | | | |
|---|---|---|---|---|---|---|---|---|---|
| | 1 | 2 | 3 | 4 | 5 | 6 | 7 | 8 | 9 |
| operating times | 4 | 5 | 6 | 6 | 7 | 8 | 8 | 9 | 10 |

It is to be understood that the present invention is not to be limited to the number of, or relationship between, preferred speed and rain droplet levels described herein.

Figure 2A:
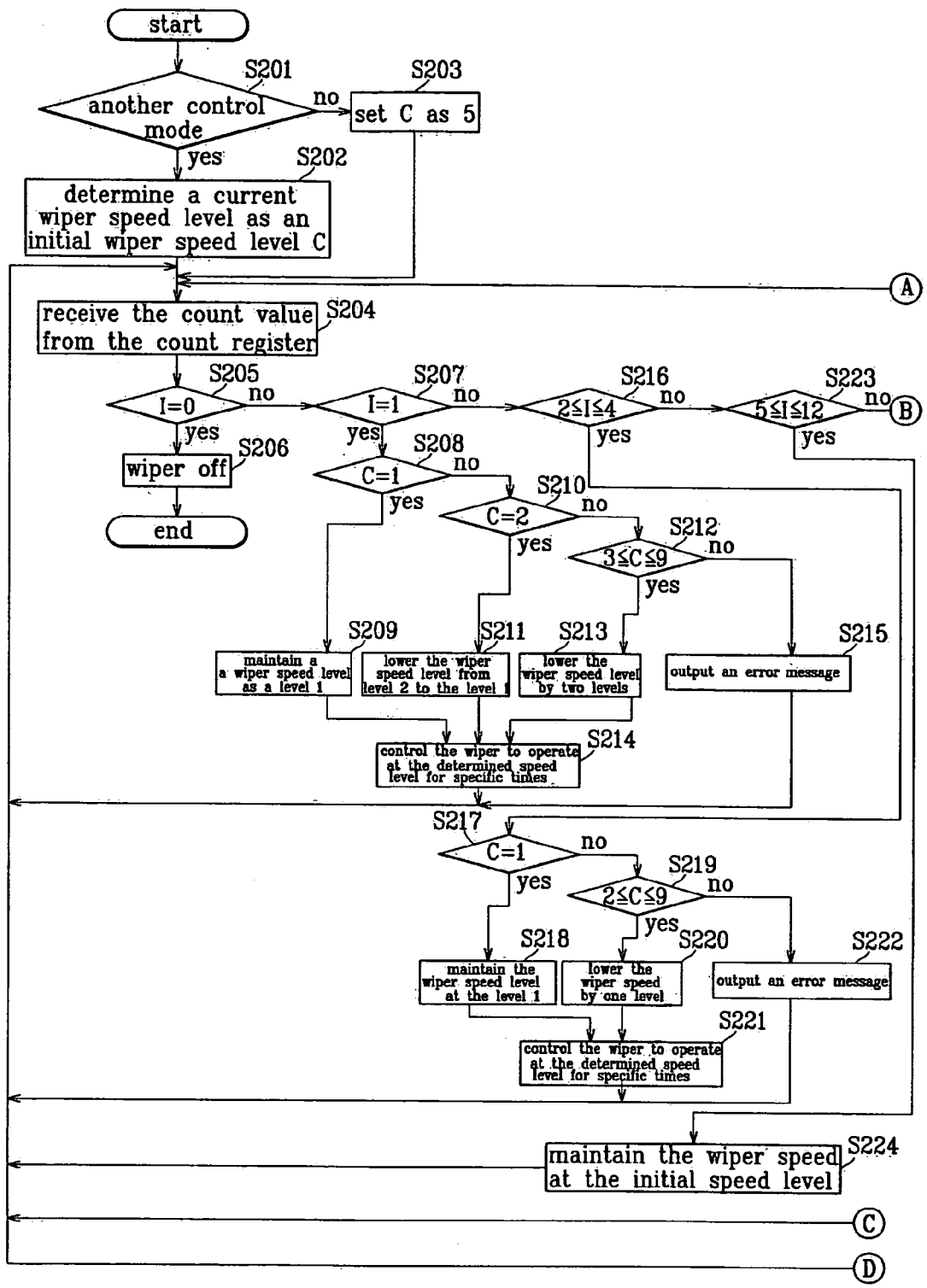
FIGS. 2a and 2b show a flowchart of a wiper control method according to a preferred embodiment of the present invention.
Figure 2B:
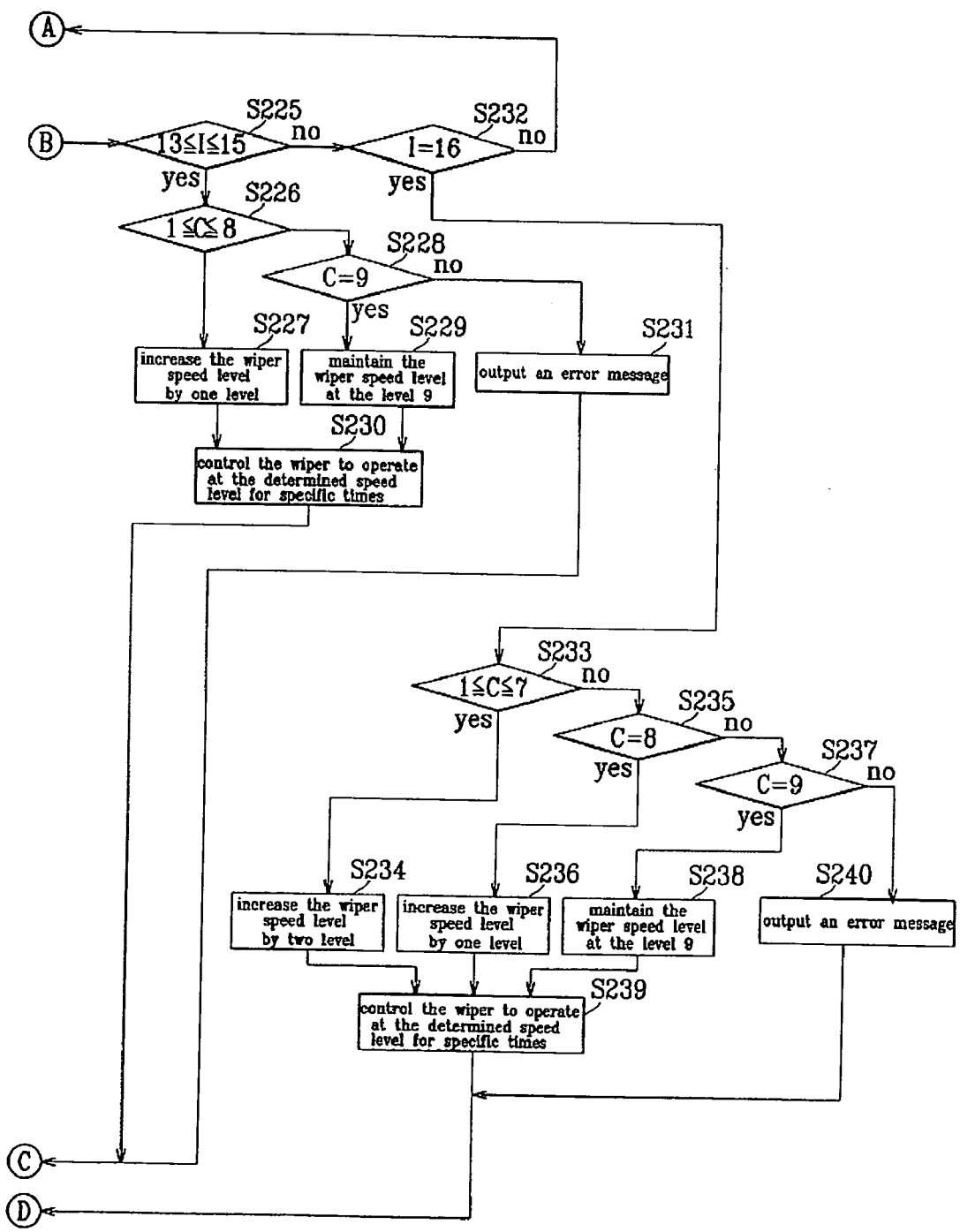

Referring to FIGS. 2A and 2B, a wiper control method according to a preferred embodiment of the present invention will be explained hereinafter. In the drawings, a character I indicates a level of an amount of rain droplets, and a character C indicates a level of a wiper speed.

At first ("Start" in FIG. 2A), the wiper fuzzy controller 70 determines an initial wiper speed level C among the nine predetermined wiper speed levels.

In step S201, the wiper fuzzy controller 70 determines whether the wiper 90 has been operating in another control mode.

If the determination in step S201 is affirmative, the wiper fuzzy controller 70 determines a current wiper speed level as the initial wiper speed level C (step S202).

On the other hand, if the determination in step S201 is negative, the wiper fuzzy controller 70 sets the wiper speed level C as 5, that is, the wiper fuzzy controller 70 determines the initial wiper speed level C as an intermediate value on the scale of speed values (step S203).

Then, in step S204, the wiper fuzzy controller 70 receives the count value from the count register 30, and determines a corresponding rain droplet amount level I among the seventeen rain droplet amount levels.

The wiper fuzzy controller 70 determines whether a value of I is equal to 0 in step S205, and if so, the wiper fuzzy controller 70 stops the operation of the wiper 90 in step S206.

If the determination in step S205 is negative, it is determined whether the value of I is equal to 1 in step S207.

If the determination in step S207 is affirmative, it is determined whether a value of C is equal to 1 in step S208.

If the determination is step S208 is affirmative, the wiper speed level is maintained at the initial wiper speed level 1 (step S209).

On the other hand, if the determination in step S208 is negative, it is determined whether the value of C is equal to 2 in step S210.

If the determination in step S210 is affirmative, the wiper speed level is lowered by one level. That is, the wiper speed level is lowered from the level 2 (C=2) to the level 1.

If the determination in step S210 is negative, it is determined whether the value of C is between 3 and 9 in step S212.

If the determination in step S212 is affirmative, the wiper speed level is lowered by two levels in step S213.

After performing steps S209, S211, and S213, the wiper fuzzy controller 70 controls the wiper 90 to operate at the determined speed level for the specific times as shown in the table hereinabove (step S214).

If the determination in step S212 is negative, the wiper fuzzy controller 70 causes an error message to be output in step S215.

The control procedure returns to step S204 after performing steps S214 and S215.

Meanwhile, if it is determined that the value of I is not 1 in step S207, it is determined whether the value of I is between 2 and 4 (S216).

If the determination in S216 is affirmative, it is then determined whether the value of C is equal to 1 (S217).

If the determination in S217 is affirmative, the wiper speed level is maintained at a current speed level, e.g., at the level 1 (S218).

If the determination in S217 is negative, it is determined whether the value of C is between 2 and 9 (S219).

If the determination in S219 is affirmative, the wiper speed level is lowered by one level (S220).

After performing steps S218 and S220, the wiper fuzzy controller 70 controls the wiper 90 to operate at the determined speed level for the specific times as shown in the table 2 (step S221).

If the determination in step S219 is negative, the wiper fuzzy controller 70 causes an error message to be output (S222).

The control procedure returns to step S204 after performing steps S221 and S222.

Meanwhile, if the determination in step S216 is negative, it is determined whether the value of I is between 5 and 12 in step S223.

If the determination is step S223 is affirmative, the wiper speed level is maintained at the initial speed level (S224). Then, the control procedure returns to step S204.

If the determination in step S223 is negative, it is determined whether the value of I is between 13 and 15 in step S225 (referring to FIG. 2B, carrying over from FIG. 2A, from (B)).

If the determination in step S225 is affirmative, it is determined whether the value of C is between 1 and 8 in step S226.

If the determination in step S226 is affirmative, the wiper speed level is increased by one level in step S227.

On the other hand, if the determination in step S226 is negative, it is determined whether the value of C is 9 in step S228.

If the determination in step S228 is affirmative, the wiper speed level is maintained at the initial speed (level 9) (S229).

After performing steps S227 and S229, the wiper fuzzy controller 70 causes the wiper 90 to operate at the determined speed level for the specific times as shown in the table hereinabove (step S230).

If the determination in step S228 is negative, the wiper fuzzy controller 70 causes an error message to be output in step S231.

The control procedure returns to step S204, after performing steps S230 or S231.

If the determination in step S225 is negative, it is determined whether the value of I is equal to 16 in step S232.

If the determination in step S232 is negative, the control procedure returns to step S204, (in FIG. 2A, via continuation marker (A)).

If the determination in step S232 is affirmative, it is determined whether the value of C is between 1 and 7 in step S233.

If the determination in step S233 is affirmative, the wiper speed level is increased by two levels (S234).

If the determination in step S233 is negative, it is determined whether the value of C is equal to 8 in step S235.

If the determination in step S235 is affirmative, the wiper speed level is increased by one level in step S236.

If the determination in step S235 is negative, it is determined whether the value of C is equal to 9 in step S237.

If the determination in step S237 is affirmative, the wiper speed level is maintained at the initial wiper speed (level 9) (S238).

After performing steps S234, S236, and S238, the wiper fuzzy controller 70 causes the wiper 90 to operate at the determined speed level for the specific times as shown in the table 2 (step S239).

Meanwhile, if the determination in step S237 is negative, the wiper fuzzy controller 70 causes an error message to be output in step S240.

The control procedure returns to step S204, after performing steps S239 or S240, (refer to FIG. 2A, through continuation marker (C)).

Preferably, the wiper fuzzy controller 70 determines an amount of rain droplets, by a mean value of six detected values for the three strokes of the wiper 90.

According to the various embodiments of the present invention, the wiper speed can be automatically changed according to the amount of rain droplets, thereby increasing a driver's convenience level.

Furthermore, when the vehicle speed is higher than the predetermined speed, the operation of the wiper speed control is stopped, thereby increasing safety.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A wiper control system comprising:
    a rain droplet detector with a plurality of switches that are configured to be electrically connected by rain droplets, each switch outputting one of two different signals according to an electrical connection thereof;
    a multiplexer receiving signals from each of the plurality of the switches, the multiplexer being configured to repeatedly perform a process of selecting one of the received signals and outputting the selected signal;
    a count register connected to the multiplexer to receive the signal output from the multiplexer, the count register counting a number of the signals corresponding to the electrical connection of the switches of the rain droplet detector and outputting a counted value; and
    a wiper control unit connected to the count register to receive the counted value, the wiper control unit controlling a speed of a wiper based on the counted value, further comprising a clock signal provider providing a clock signal to the multiplexer, wherein the multiplexer selects one of the signals input from the rain droplet detector based on the received clock signal, further comprising a wiper position sensor detecting a position of the wiper and outputting a corresponding wiper position signal, wherein the clock signal provider receives the wiper position signal and is configured to output the clock signal when the wiper rotates by a predetermined angle.

2. The wiper control system of claim 1, wherein the multiplexer is configured to sequentially output the signals input from the plurality of switches in response to the received clock signal.

3. The wiper control system of claim 1, wherein the predetermined angle is 45 degrees.

4. A wiper control system comprising:
    a rain droplet detector with a plurality of switches that are configured to be electrically connected by rain droplets, each switch outputting one of two different signals according to an electrical connection thereof;
    a multiplexer receiving signals from each of the plurality of the switches, the multiplexer being configured to repeatedly perform a process of selecting one of the received signals and outputting the selected signal;
    a count register connected to the multiplexer to receive the signal output from the multiplexer, the count register counting a number of the signals corresponding to the electrical connection of the switches of the rain droplet detector and outputting a counted value; and
a wiper control unit connected to the count register to receive the counted value, the wiper control unit controlling a speed of a wiper based on the counted value, further comprising a clock signal provider providing a clock signal to the multiplexer, wherein the multiplexer selects one of the signals input from the rain droplet detector based on the received clock signal, further comprising a wiper position sensor detecting a position of the wiper and outputting a corresponding wiper position signal, wherein the clock signal provider receives the wiper position signal and is configured to output the clock signal when the wiper rotates by a predetermined angle,
    wherein the wiper control unit determines a rain droplet amount level based on the received counted value, determines a wiper speed level based on the determined rain droplet amount level, and controls the wiper to operate at the determined speed level, and
    wherein the wiper control unit determines the rain droplet amount level using the counted values that are acquired during 3 strokes of the wiper.

5. The wiper control system of claim 4, further comprising a vehicle speed sensor detecting a vehicle speed and outputting a corresponding vehicle speed signal, wherein the wiper control unit receives the vehicle speed signal and controls the speed of the wiper based on the vehicle speed signal.

6. The wiper control system of claim 5, wherein the wiper control unit stops a control of the speed of the wiper when the vehicle speed is higher than a predetermined speed.

7. The wiper control system of claim 4, wherein the wiper control unit is programmed to perform a control logic comprising:
determining an initial wiper speed level among a plurality of wiper speed levels corresponding to different wiper speeds;
determining a current rain droplet amount level among a plurality of rain droplet amount levels based on the received counted value; and
controlling the speed of the wiper based on the initial wiper speed level and the determined rain droplet amount level.

8. A wiper control method comprising:
determining an initial wiper speed level among nine predetermined wiper speed levels that include nine sequential levels from a wiper speed level 1 to a wiper speed level 9, each of the predetermined wiper speed levels corresponding to a different wiper speed;
detecting an amount of rain droplets and determining a corresponding rain droplet amount level among seventeen predetermined rain droplet amount levels that include seventeen sequential levels from a rain droplet amount level 0 to a rain droplet amount level 16, each of the predetermined rain droplet amount levels corresponding to a different rain droplet amount; and
controlling a wiper speed based on the rain droplet amount level and the initial wiper speed level, wherein in the controlling a wiper, the wiper speed level is regulated based on the rain droplet amount level and the initial wiper speed level, and the wiper is controlled to operate a predetermined number of times in response to the regulated wiper speed level.

9. The wiper control method of claim 8, wherein in the controlling a wiper, the wiper is controlled to not operate if it is determined that the amount of rain droplets corresponds to the rain droplet amount level 0 indicative of no rain droplets.

10. The wiper control method of claim 8, wherein in the controlling a wiper, in the case that the amount of the rain droplets corresponds to a rain droplet amount level 1, the wiper speed level is maintained if the initial wiper speed level is the wiper speed level 1, the wiper speed level is lowered by one level if the initial wiper speed level is the wiper speed level 2, and the wiper speed level is lowered by two levels if the initial wiper speed level is between a wiper speed level 3 and a wiper speed level 9.

11. The wiper control method of claim 8, wherein in the controlling a wiper, in the case that the amount of the rain droplets corresponds to between a rain droplet amount level 2 and a rain droplet amount level 4, the wiper speed level is maintained if the initial wiper speed level is the wiper speed level 1, and the wiper speed level is lowered by one level if the initial wiper speed level is between a wiper speed level 3 and a wiper speed level 9.

12. The wiper control method of claim 8, wherein in the controlling a wiper, in the case that the amount of the rain droplets corresponds to between a rain droplet amount level 5 and a rain droplet amount level 12, the wiper speed is maintained at the initial wiper speed level.

13. The wiper control method of claim 8, wherein in the controlling a wiper, in the case that the amount of the rain droplets corresponds to between a rain droplet amount level 13 and a rain droplet amount level 15, the wiper speed level is increased by one level if the initial wiper speed level is between a wiper speed level 1 and a wiper speed level 8, and the wiper speed level is maintained at the initial wiper speed level if the initial wiper speed level is a wiper speed level 9.

14. The wiper control method of claim 8, wherein in the controlling a wiper, in the case that the amount of the rain droplets corresponds to a rain droplet amount level 16, the wiper speed is increased by two levels if the initial wiper speed level is between a wiper speed level 1 and a wiper speed level 7, the wiper speed is increased by one level if the initial wiper speed level is a wiper speed level 8, and the wiper speed is maintained at the initial wiper speed level if the initial wiper speed level is a wiper speed level 9.

* * * * *

UNITED STATES PATENT AND TRADEMARK OFFICE
CERTIFICATE OF CORRECTION

PATENT NO. : 7,009,355 B2  Page 1 of 1
APPLICATION NO. : 10/747889
DATED : March 7, 2006
INVENTOR(S) : Jea Sung Heo It is certified that error appears in the above-identified patent and that said Letters Patent is hereby corrected as shown below:

On the front page:

Left column, line (73)

"Hyundai Motor Company, Seoul (KR)"
should be changed to

-- Kia Motors Corporation, Seoul (KR);
Hyundai Motor Company, Seoul (KR) --.

Signed and Sealed this

Twelfth Day of December, 2006

JON W. DUDAS
*Director of the United States Patent and Trademark Office*